Nov. 3, 1959 M. TANENBAUM 2,911,539

PHOTOCELL ARRAY

Filed Dec. 18, 1957

INVENTOR
M. TANENBAUM

BY Arthur J. Torsiglieri

ATTORNEY

United States Patent Office 2,911,539

Patented Nov. 3, 1959

2,911,539

PHOTOCELL ARRAY

Morris Tanenbaum, Madison, N.J., assignor to Bell Telephone Laboratories, Incorporated, New York, N.Y., a corporation of New York Application December 18, 1957, Serial No. 703,560

5 Claims. (Cl. 250—211)

This invention relates to a photoelectric device and more particularly to a photoelectric device capable of analyzing a two-dimensional light pattern.

There are many applications in which it is desirable to analyze a two-dimensional light pattern element by element in some random or preferred order. Typically, an analysis may be desired of information stored as a two-dimensional photographic image. This can be done by a flying spot scanner, but the circuitry required is considerable and complex, particularly, if there is desired coordinate access, i.e., selective access in either coordinate direction to a particular element of the image. Such analysis can also be achieved by an array of individual photoelectric cells, one associated with each element of the image. However, this expedient, too, has its difficulties since typically the light pattern to be analyzed may consist of thousands of elements and the cost of an arrangement involving thousands of individual photoelectric cells would be prohibitive.

The present invention provides a unitary structure which is capable of coordinate access and so particularly well adapted for analyzing a two-dimensional light pattern.

A feature of the invention is a semiconductive body which comprises a two-dimensional array of photoelectric elements, each individual element being sufficiently isolated electrically from neighboring elements to minimize crosstalk. In particular, each element is made up of three layers of semiconductive material with contiguous layers being of opposite conductivity type for defining a pair of parallel rectifying junctions. Of the pair of rectifying junctions one is close to the surface of the body and serves as the photosensitive portion of the element and the other is deeper in the body and is useful in electrically isolating individual elements. Additionally, the geometry of the body is designed to make possible the desired coordinate access with a minimum number of lead connections to the body and, at the same time, to provide electrical isolation between the individual photoelectric elements.

It can be shown by analysis that to provide electrical isolation between the individual photoelectric elements it is important that the semiconductive body include at least three layers and that the intermediate one of such three layers be divided into discrete portions, one for each photoelectric element of the two-dimensional array.

The invention will be more fully understood from the following more detailed description, taken in conjunction with the accompanying drawing, in which:

Each of Figs. 1 through 3 shows in a different stage of fabrication a semiconductive body suitable for use in the practice of the invention;

Figure 1:
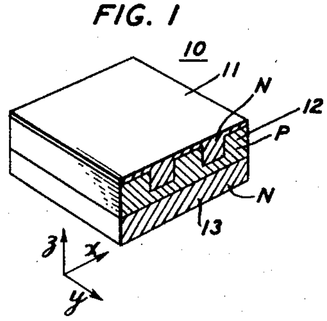
Figure 2:
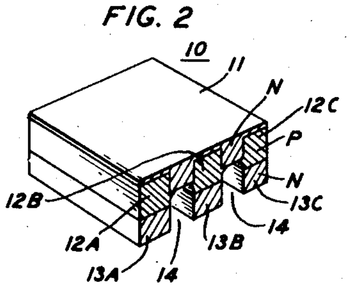
Figure 3:
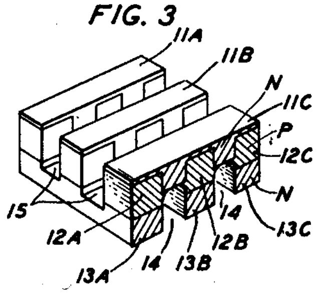

With reference now more particularly to the drawing, Figs. 1 through 3 show in successive stages of manufacture a semiconductive body 10 of the kind suited for use in the practice of the invention. For purposes of illustration, the semiconductive body has been designed to have only three photoelectric elements in each coordinate dimension, although typically a much larger number would be present. As shown in Fig. 1, the semiconductive body 10 includes n-type zones 11 and 13 on opposite surfaces and an intermediate p-type zone 12. The surface zone 11 has a thickness which is uniform in the $y$ dimension but varies periodically in a step function between two values in the $x$ dimension. Since the body is to include three columns of elements in the $x$ dimension, there are provided along the $x$ direction in the surface zone 11 three regions of small thickness separated by intermediate regions of greater thickness to provide three rectifying junctions close to the surface of the body. The thickness of the low thickness regions is made sufficiently low that good photoelectric properties result. Typically, this thickness is made such that the associated rectifying junction is less than a diffusion length of the minority carriers away from the surface of the body. The thickness of the larger thickness regions of the zone 11 is made sufficiently large that the mechanical strength of the structure remains adequate after the localized etching to be described has been completed. The thickness of the intermediate layer 12 underlying the shallow regions of the zone 11 should be at least several diffusion lengths of minority carriers. The opposite n-type surface zone 13 is advantageously of uniform thickness, typically also at least several diffusion lengths thick to provide mechanical strength.

Various techniques are feasible for providing a structure of this kind. Typically, one may begin with a monocrystalline silicon body of p-type conductivity and provide on one surface a series of longitudinal strips of silicon oxide film located to correspond with a desired position of the shallow regions of the surface zone 11. Various techniques are possible for providing such a series of longitudinal strips. Heating in an oxidizing atmosphere a silicon body and subsequently etching away longitudinal regions of the oxide is one possible technique for providing such strips. Thereafter, the silicon body may be heated in an atmosphere which includes a donor for the gaseous diffusion of the donor into the body. The donor chosen should be one which diffuses deeper in regions where the surface is free of the oxide than in the regions of surface oxide. Techniques of this kind are discussed more fully in United States Patent No. 2,802,760, which issued to L. Derick and C. J. Frosch on August 13, 1957. After removal of the diffused edge material, a structure similar to that shown in Fig. 1 results.

Thereafter, using known localized etching techniques longitudinal grooves 14 extending in the $y$ direction are etched in the surface of the body associated with zone 13 at positions opposite the deeper regions of the zone 11. The grooves 14 are made sufficiently deep to penetrate into the deeper regions of the zone 11 whereby the intermediate zone 12 and the surface zone 13 are each divided in the $x$ direction by the grooves 14 into three separate zones 12*a*, 12*b*, and 12*c* and 13*a*, 13*b* and 13*c* as shown in Fig. 2.

Figure 4:
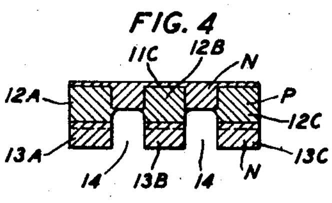
Fig. 4 shows a front view of the body of Figs. 1 through 3 in its finished state.
Figure 5:
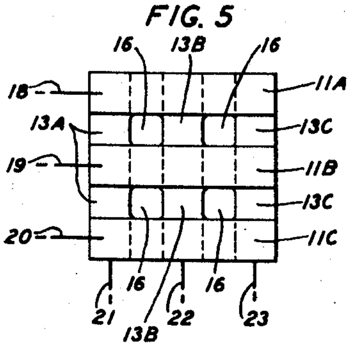
Fig. 5 shows a top view of the body of Fig. 4 to which there have been added electrode connections to provide a photoelectric device in accordance with the invention.

Thereafter, transverse grooves 15 extending in the $x$ direction are etched again by known localized etching techniques, in the surface of the body associated with surface zone 11. The grooves 15 are spaced regularly to divide the surface zone 11 in the $y$ direction into three separate zones 11*a*, 11*b* and 11*c*, as shown in Fig. 3. The division of surface zone 11 into three separate zones adapts the body for including along the *y* coordinate direction three rows of elements. The depth of these grooves 15 is arranged to intersect with grooves 14 to create voids at such intersections and to penetrate completely the intermediate p-type zones 12*a*, 12*b* and 12*c*. The resultant structure is shown in perspective in Fig. 3 and in front and top views in Figs. 4 and 5, respectively. The voids 16 corresponding to the interactions of the grooves 14 and 15 are seen in Fig. 5.

Finally, it is necessary to provide electrode connections to various zones of the body. In particular, there is provided a separate low resistance ohmic connection to each of zones 11*a*, 11*b*, 11*c*, 13*a*, 13*b* and 13*c*. It is sufficient to make connection to an edge portion of each of these zones. Such electrode connections are shown in Fig. 5 and designated by the reference numerals 18, 19, 20 and 21, 22, and 23, respectively. Various techniques are known for providing suitable connections of this type. The electrodes 18, 19 and 20 provide control in the *y* direction and the electrodes 21, 22 and 23 control in the *x* direction of the two-dimensional array.

The semiconductive body described may be utilized either as an array of photoresistive cells or as an array of photovoltaic cells in the manner known for the operation of two-dimensional arrays. Typically, the state of a particular element of the array is sampled by inserting the load selectively between the two electrode connections to the two opposite surface zones whose coordinates fix the element whose light state is to be sampled. If the photoresistive effect is being utilized, a potential difference should be maintained on the two electrode connections of polarity to bias the rectifying junction between the appropriate portions of surface zone 11 and intermediate zone 12. Light shining on the surface over this junction will reduce the high resistance associated with such reverse biased junction in the absence of light. Alternatively, if the photovoltaic effect is being utilized, it is unnecessary to apply a voltage difference between the two electrode connections and instead whether a voltage difference exists is examined to ascertain the light state of the corresponding element of the body.

Various suitable arrangements are available for projecting the light pattern to be analyzed on the photosensitive surface of the semiconductive device. It is generally advantageous to interpose a suitable masking grid between the light source and the photoelectric structure to localize the light on the photosensitive portions of the photoelectric structure.

It is to be understood that the specific embodiment described is merely illustrative of the principles of the invention. Various modifications may be provided without departing from the spirit and scope of the invention. In particular, in the structure depicted the role of grooves in dividing the surface layers into discrete zones can be duplicated by the use there of high resistivity material such as substantially intrinsic material. Additionally, it is obvious that there may be employed a semiconductive body in which the surface zones are p-type and the intermediate zone n-type.

It is also possible in the interest of greater ease of fabrication to prepare smaller semiconductive bodies each of which includes a plurality of photoelectric elements arranged in one or more rows or columns and thereafter to fashion a two-dimensional unitary structure from such separate bodies.

What is claimed is:

1. A photoelectric device comprising a semiconductive body including a plurality of cells aligned in a two-dimensional array, each cell comprising an intermediate zone of one conductivity type between surface zones of the opposite conductivity type for forming a pair of rectifying junctions in each of the cells, one of said rectifying junctions in each cell being parallel to and close to a surface portion of the body so that it is sensitive to light incident on the overlying surface portion of the body which surface portion has a thickness which is uniform in the *y* direction but varies periodically in the *x* direction, each of the photocells of the array having one surface zone electrically connected to the corresponding surface zone of the photocells aligned therewith along one dimension of the array and electrically isolated from the corresponding surface zone of the photocells aligned therewith along the other dimension of the array, each of the photocells of the array having its other surface zone electrically isolated from the corresponding surface zone of the photocells aligned therewith along said one dimension of the array and electrically connected to the corresponding surface zone of the photocells aligned therewith along said other dimension of the array, and the intermediate zones of all the photocells being electrically isolated.

2. A photoelectric device according to claim 1 further characterized in that the electrical isolation between surface zones of the semiconductive body is provided by grooves in the semiconductive body.

3. A photoelectric device according to claim 1 and a separate electrode connection to each group of electrically connected surface layers.

4. A photoelectric device comprising a unitary structure including a plurality of semiconductive cells aligned in a two-dimensional array of rows and columns, each cell comprising an intermediate zone of one conductivity type intermediate between a pair of zones of opposite conductivity type for defining a pair of rectifying junctions in the cell, one of the rectifying junctions being less than a diffusion length of minority carriers from the surface of the body and the pair of rectifying junctions being spaced apart at least several diffusion lengths of minority carriers, characterized in that the intermediate zones of all of the cells are electrically isolated from one another, each of the cells has one zone electrically connected to one zone of each other cell in the same row and one zone electrically isolated from the corresponding zone of each other cell in the same row, and each of the cells has one zone electrically connected to one zone of each other cell in the same column and one zone electrically isolated from the corresponding zone of each other cell in the same column.

5. A photoelectric device comprising a semiconductive body including a plurality of cells arranged in a two-dimensional array of rows and columns, each cell comprising an intermediate zone of one conductivity type between a pair of surface zones of opposite conductivity type for defining a pair of rectifying junctions in the cell, one of the rectifying junctions being less than a diffusion length of minority carriers from the surface of the body, and the pair of rectifying junctions being spaced apart at least several diffusion lengths of minority carriers, characterized in that the intermediate zones of all of the cells are electrically isolated from one another, each of the cells has one zone which is coextensive with the corresponding zone of each other cell in the same row and one zone which is electrically isolated from the corresponding zone of each other cell in the same row, and each of the cells in the same column has one zone which is coextensive with the corresponding zone of each other cell in the same column and one zone electrically isolated from the corresponding zone of each other cell in the same column.

References Cited in the file of this patent

UNITED STATES PATENTS 2,663,830 Oliver ---------------- Dec. 22, 1953